A. JACOBSON & G. N. GARLAND.
ROPE SPLICING FID.
APPLICATION FILED JULY 5, 1918.
1,293,453.
Patented Feb. 4, 1919.
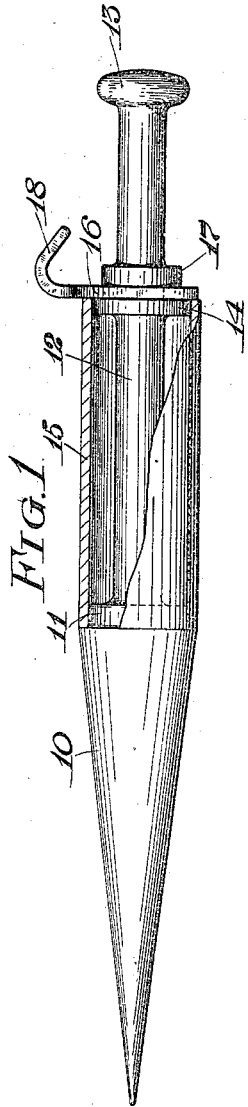
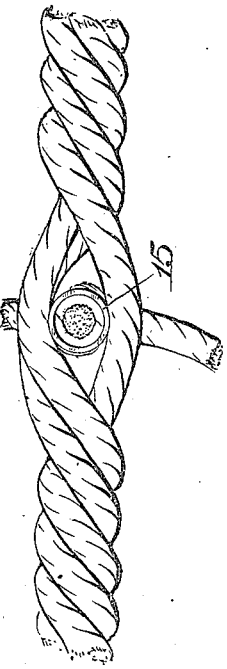
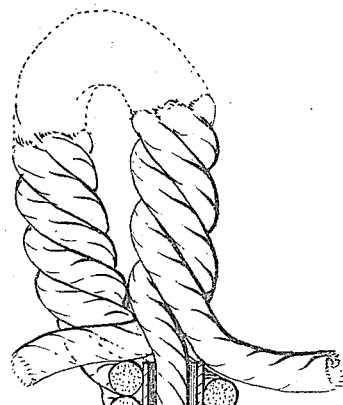
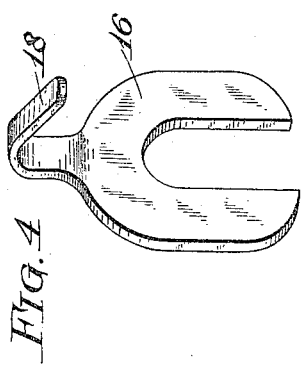
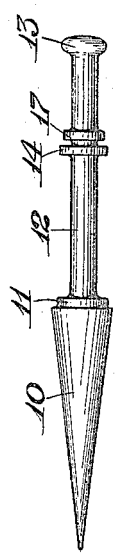
WITNESSES.
INVENTORS.

UNITED STATES PATENT OFFICE.

ARTHUR JACOBSON AND GUY N. GARLAND, OF MILWAUKEE, WISCONSIN.

ROPE-SPLICING FID.

1,293,453.     Specification of Letters Patent.     Patented Feb. 4, 1919.

Application filed July 5, 1918. Serial No. 243,456.

*To all whom it may concern:*

Be it known that we, ARTHUR JACOBSON and GUY N. GARLAND, citizens of the United States, and residents of Milwaukee, in the county of Milwaukee and State of Wisconsin, have invented new and useful Improvements in Rope-Splicing Fids, of which the following is a description, reference being had to the accompanying drawings, which are a part of this specification.

This invention has for its object to provide a fid for use in splicing heavy rope which is provided with a detachable sleeve adapted to be left within the rope proper to form a guide through which the free end of one of the rope strands may be passed and drawn tightly into place before it is removed.

Another object of the invention is to provide for securely locking the guide sleeve in place on the stem of the fid.

With the above and other objects in view the invention consists in the rope splicing fid as herein claimed and all equivalents.

Referring to the accompanying drawings in which like characters of reference indicate the same parts in different views:

Figure 1 is a side view of a rope splicing fid constructed in accordance with this invention, the removable sleeve thereof being sectioned;

Fig. 2 is a view thereof with the fid member withdrawn through the sleeve and a splicing strand passed therethrough;

Fig. 3 is a view thereof on the plane of line 3—3 of Fig. 2; and,

Fig. 4 is a perspective view of the locking slide.

In these drawings 10 indicates a conical fid member having a reduced shoulder 11 and a stem 12 on the end of which is formed the knob or other suitable handle 13. At a distance from the shoulder 11 is an annular flange 14 of substantially the same diameter, the shoulder and the flange having fitted thereon a tubular sleeve 15 with an external diameter approximately equal to the largest diameter of the conical head of the fid member so as to form a smooth joint therewith. The sleeve 15 is locked in its position by means of a slotted plate 16 forming a locking slide by fitting between the flange 14 and a similar flange 17 on the stem 12 spaced therefrom, the slot in the end of the locking slide receiving the stem 12. Opposite the slot the locking slide 16 is preferably provided with a bent hook-like projection 18 forming a finger hook by which it may be withdrawn from the annular groove between the flanges to unlock the sleeve. The parts on the stem are of smaller diameter than the bore of the sleeve 15 so that when the locking slide is removed they may pass through the sleeve and permit the fid member to be withdrawn, as in Fig. 2. When the locking slide is in place, however, it engages the end of the sleeve and holds the parts securely together.

In operation when it is desired to make a splice with a heavy twisted rope, instead of attempting to follow the pin with one of the loose strands of the rope end after the pin has been forced between the tightly twisted strands in the body portion of the rope, the fid of the present invention is only forced between the strands of the rope as far as the sleeve 15. The locking slide 16 is then removed by pulling on the finger hook 18 and the fid member is withdrawn from the sleeve without difficulty as the sleeve holds the rope strands apart. With the sleeve as a guide the loose strands of the rope end may easily be threaded between the strands of the rope body. They are passed through the sleeve and are drawn tight so that the twisted end portion of the rope is brought into abutment with the spread portion of the rope body, for the tubular sleeve when inserted is forced through the rope body to near its rear end to permit of this operation. The sleeve being open at both ends permits the rope strand being drawn home in this manner before the sleeve is withdrawn and thus avoids the necessity for tightening the splicing strand by pulling it between the tightly clamping twisted strands of the rope body. The smooth metal surface of the sleeve enables it to be withdrawn without difficulty and when reassembled the fid may be repeatedly used in a like manner for forcing an opening between the strands of the rope body and guiding the loose strands therethrough until all of the loose strands are securely woven in place.

The sleeve open at both ends, furthermore, permits the splicing strands to be twisted to the desired extent before removing the sleeve.

The use of this tool enables the splicing operation to be easily performed with the heavy ropes and the work is neater and stronger than when done in the usual way as the strands may be twisted to assist in their close fitting relation.

We desire it to be understood that this invention is not limited to any specific form or arrangement of parts except in so far as such limitations are specified in the claims.

What we claim as new and desire to secure by Letters Patent is:

1. A rope splicing fid, comprising a pointed fid member having a conical head with a shoulder and a stem portion forming a handle, an annular flange on the stem portion, a tubular sleeve fitting on the annular flange and the shoulder and against the conical head with its external diameter approximately that of the end of the head portion to form a smooth joint therewith, and means for releasably locking the sleeve to the stem.

2. A rope splicing fid, comprising a pointed fid member having a conical head with a reduced shoulder and a stem, a pair of annular flanges on the stem with a groove between them, a tubular sleeve member fitting on the shoulder and one of the flanges, and a slotted locking slide fitting in the groove and engaging the end of the sleeve to removably lock it in place.

In testimony whereof, we affix our signatures, in presence of two witnesses.

ARTHUR JACOBSON.

Witnesses:
 THOMAS McCUE,
 HERBERT ANDERSON.

GUY N. GARLAND.

Witnesses:
 DARWIN HUNTER,
 REUBEN PERRY, Jr.

Copies of this patent may be obtained for five cents each, by addressing the "Commissioner of Patents, Washington, D. C."